US009903513B2

(12) United States Patent
Zhu et al.

(10) Patent No.: US 9,903,513 B2
(45) Date of Patent: Feb. 27, 2018

(54) THERMOSETTING BAMBOO SAND COMPOSITE PRESSURE PIPE

(71) Applicants: ZHEJIANG XINZHOU BAMBOO-BASED COMPOSITES TECHNOLOGY CO., LTD., Hangzhou, Zhejiang (CN); Ling Ye, Huzhou, Zhejiang (CN)

(72) Inventors: Xin Zhu, Zhejiang (CN); Ling Ye, Zhejiang (CN); Huiqing Yang, Zhejiang (CN)

(73) Assignees: Zhejiang Xinzhou Bamboo-Based Composites Technology Co., Ltd., Hangzhou, Zhejiang (CN); Ling Ye, Huzhou, Zhejiang (CN)

( * ) Notice: Subject to any disclaimer, the term of this patent is extended or adjusted under 35 U.S.C. 154(b) by 60 days.

(21) Appl. No.: 15/032,264

(22) PCT Filed: Nov. 4, 2014

(86) PCT No.: PCT/CN2014/090251
§ 371 (c)(1),
(2) Date: Apr. 26, 2016

(87) PCT Pub. No.: WO2015/067164
PCT Pub. Date: May 14, 2015

(65) Prior Publication Data
US 2016/0245429 A1    Aug. 25, 2016

(30) Foreign Application Priority Data
Nov. 7, 2013    (CN) .................... 2013 2 0697993 U

(51) Int. Cl.
*F16L 9/14*    (2006.01)
*B32B 1/08*    (2006.01)
(Continued)

(52) U.S. Cl.
CPC ....... *F16L 9/14* (2013.01); *B32B 1/08* (2013.01); *B32B 5/022* (2013.01); *B32B 5/12* (2013.01);
(Continued)

(58) Field of Classification Search
CPC .................. F16L 9/04; F16L 9/14; F16L 9/16
(Continued)

(56) References Cited

U.S. PATENT DOCUMENTS 3,871,409 A * 3/1975 Gilbu ...................... F16L 9/16
138/174
3,884,269 A * 5/1975 Schetty ................... B29C 70/14
138/137
(Continued)

FOREIGN PATENT DOCUMENTS

CN    2035034    3/1989
CN    2421152    2/2001
(Continued)

OTHER PUBLICATIONS

International Search Report for international application No. PCT/CN2014/090251, dated Jan. 16, 2015 (4 pages, including English translation).

*Primary Examiner* — Patrick F Brinson
(74) *Attorney, Agent, or Firm* — Hamre, Schumann, Mueller & Larson, P.C.

(57) ABSTRACT

A thermosetting bamboo sand composite pressure pipe comprises a inner liner layer (1), an inner reinforcement layer (2), a sand adhesive layer (3), an outer reinforcement layer (4) and an outer protection layer (5) arranged respectively from an inside to an outside in a radial direction thereof. The inner reinforcement layer (2) formed by winding bamboo, a thickening layer (3) formed by stirred ore and adhesive, and the outer reinforcement layer (4) formed by winding bamboo are arranged sequentially from an inside to an outside
(Continued)

between the inner liner layer (1) and the outer protection layer (5). The composite pressure pipe is energy-saving and environmental-friendly, raw production materials are recyclable, and a price is low.

8 Claims, 1 Drawing Sheet

(51) Int. Cl.
  B32B 5/02 (2006.01)
  B32B 5/12 (2006.01)
  B32B 5/26 (2006.01)
  B32B 7/12 (2006.01)
  B32B 9/02 (2006.01)
  B32B 27/12 (2006.01)

(52) U.S. Cl.
  CPC ............... *B32B 5/26* (2013.01); *B32B 7/12* (2013.01); *B32B 9/02* (2013.01); *B32B 27/12* (2013.01); *B32B 2260/02* (2013.01); *B32B 2260/046* (2013.01); *B32B 2262/065* (2013.01); *B32B 2264/10* (2013.01); *B32B 2307/7265* (2013.01); *B32B 2307/732* (2013.01); *B32B 2307/752* (2013.01); *B32B 2410/00* (2013.01); *B32B 2597/00* (2013.01)

(58) Field of Classification Search
  USPC ........ 138/140, 137, 174, 132, 153, 124, 125
  See application file for complete search history.

(56) References Cited

U.S. PATENT DOCUMENTS 4,243,075 A * 1/1981 McPherson ............ B29C 53/60
                                          138/124
9,057,204 B2 * 6/2015 Friedrich ................ B29C 53/60

FOREIGN PATENT DOCUMENTS

| CN | 201434160 | | 3/2010 | |
|---|---|---|---|---|
| CN | 201651576 | | 11/2010 | |
| CN | 202327397 | | 7/2012 | |
| CN | 202327397 U | * | 7/2012 | ................ F16L 9/14 |
| CN | 203604828 | | 5/2014 | |
| CN | 206093233 U | * | 4/2017 | |
| JP | 58193148 | | 11/1983 | |

* cited by examiner

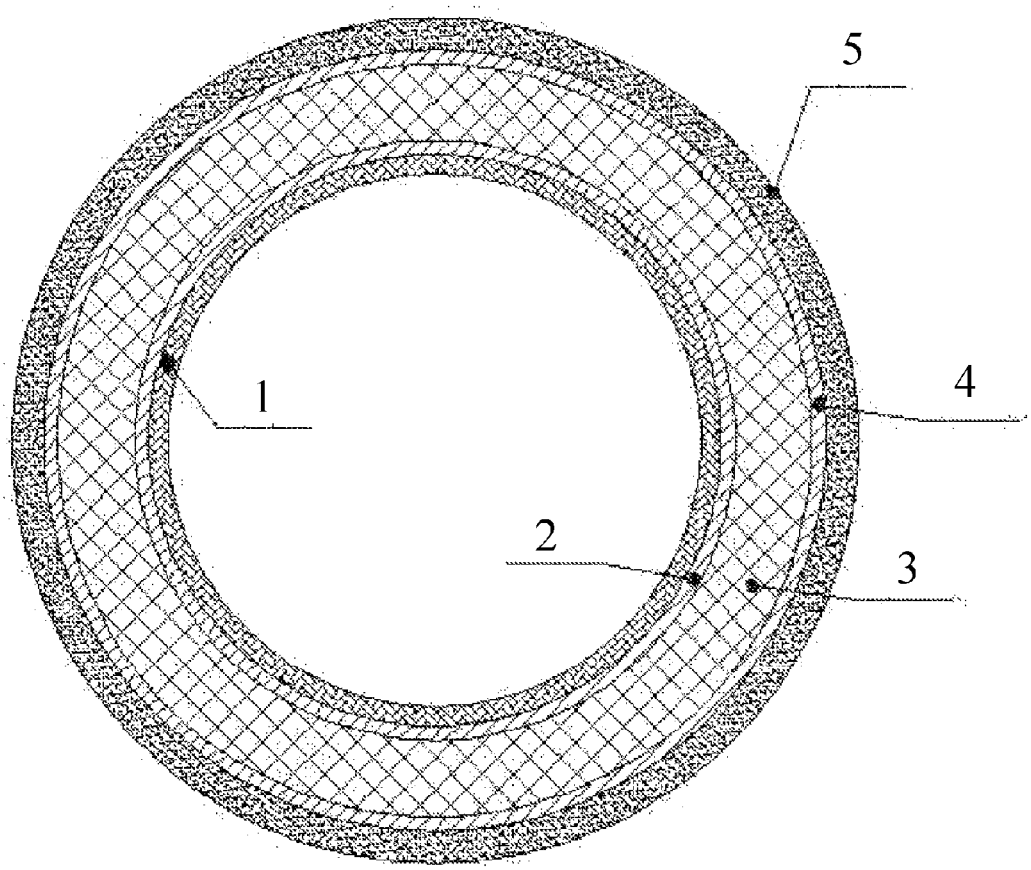

THERMOSETTING BAMBOO SAND COMPOSITE PRESSURE PIPE

FIELD OF THE INVENTION

The invention relates to a thermosetting bamboo-sand composite pressure pipe, which is suitable for use in the technical fields of agricultural irrigation, water supply and drainage, and petrochemical anticorrosion.

BACKGROUND OF THE INVENTION

In current agricultural irrigation, water supply and drainage, and petrochemical anticorrosion industries, traditional pipes, such as cement pipes, polyvinyl chloride pipes, polyethylene pipes, polypropylene pipes, FRPpipes (glass fiber reinforced plastics pipes, glass fiber reinforced plastics mortar (FRPM) pipes), steel pipes, and ductile iron pipes are generally used. Cement pipes have low production cost but low strength, heavy weight, and leaky pipe joints. Polyvinyl chloride pipes, polyethylene pipes, polypropylene pipes are lightweight, smooth, and corrosion resistant but insufficient in rigidity and strength, and the raw materials thereof are all synthetic petrochemicals. FRP pipes and FRPM pipes have strong corrosion resistance, high strength, small fluid resistance, and large rigidity, but the raw materials of the reinforced materials in the products is glass fiber with high energy consumption. While the resin is petrochemical and the products and wastes thereof are non-recyclable and pollutional. Metal pipes, such as steel pipes and ductile iron pipes, have high strength but poor corrosion resistance, high energy consumption, and high pollution. Therefore, the use of such traditional pipes not only consumes a large quantity of petroleum and mineral resources, but also results in high energy consumption, high emission, and large depletion of non-renewable resources.

Chinese Patent Application No. 2009201212098 entitled "bamboo fiber winding composite pipe" discloses a structure including an inner liner layer, a reinforcement layer, and an outer protection layer arranged from the inside out in the radial direction. The reinforcement layer is a bamboo fiber layer formed by winding continuous bamboo fiber strips on the inner liner layer. The bamboo fiber layer is a circular layer of the bamboo fiber strips, a spiral layer of the bamboo fiber strips, or a combination thereof. And at least two bamboo fiber layers are designed. This bamboo composite pipe satisfies advanced concepts of energy saving and renewable resources, and the price thereof is much cheaper than the traditional pipes (except the cement pipes). However, in some application fields with low pressure and high rigidity, especially for agricultural irrigation, the price of this bamboo composite pipe is still high.

SUMMARY OF THE INVENTION

In view of the above-described problems, it is one objective of the invention to provide a thermosetting bamboo-sand composite pressure pipe that is energy saving and environment protective and has renewable raw materials and cheap price.

Technical scheme of the invention is as follows:

A thermosetting bamboo-sand composite pressure pipe comprises: an inner liner layer, an inner reinforcement layer, a sand-adhesive thickening layer, an outer reinforcement layer, and an outer protection layer. The inner reinforcement layer formed by winding bamboo strips, the sand-adhesive thickening layer formed by mixed ore sand and adhesive, and the outer reinforcement layer formed by winding bamboo strips are respectively disposed between the inner liner layer and the outer protection layer from the inside out. The invention adopts multi-layer composite structure, the inner reinforcement layer and the outer reinforcement layer adopts environmentally friendly and renewable bamboo. As a regenerative and environment protective resource, the bamboo possesses lightweight, high strength, anticorrosion, cheap price, and wide distribution. The sand-adhesive thickening layer not only increases the rigidity of the pipe, but also reduces the usage of the bamboo, thus further decreasing the production cost.

The bamboo strips of the inner reinforcement layer are regularly wound and adhered to an outer surface of the inner liner layer. The sand-adhesive thickening layer comprises a mixture of ore sand and adhesive uniformly coated on an outer surface of the inner reinforcement layer. The bamboo strips of the outer reinforcement layer are regularly wound and adhered to an outer surface of the sand-adhesive thickening layer. When winding the bamboo strips of the inner reinforcement layer and the outer reinforcement layer, a certain amount of an amino resin is simultaneously added, and the thickness of each layer is in accordance with the use requirement to enable the pipe to reach a designed strength. In the sand-adhesive thickening layer, an ore sand having high hardness and low price is employed. The ore sand and the resin adhesive are evenly mixed and coated on the outer surface of the inner reinforcement layer, and the thickness of the sand-adhesive thickening layer is designed according to different use requirement.

The bamboo strips of the inner reinforcement layer and the outer reinforcement layer have a length of between 0.5 and 2 m, a width of between 5 and 10 mm, and a thickness of between 0.3 and 1 mm. The bamboo strips of such size have low processing difficulty, high utilization, reduced production cost, and sufficient adhering strength in thermal expansion and cold contraction conditions.

In the inner reinforcement layer, the bamboo strips are first radially wound to form a first radial layer to adhere to the outer surface of the inner liner layer. The bamboo strips are then axially wound to form a first axial layer to adhere to an outer surface of the first radial layer. The winding of the bamboo strips in the radial direction and subsequent in the axial direction is able to optimize the loading performance of the pipe.

In the outer reinforcement layer, the bamboo strips are first axially wound to form a second axial layer to adhere to the outer surface of the sand-adhesive thickening layer. The bamboo strips are then radially wound to form a second radial layer to adhere to an outer surface of the second axial layer. The outer reinforcement layer is wounded by the bamboo strips in the axial direction and then in the radial direction, the order of which is opposite to the winding of the inner reinforcement layer, thus the loading performance of the pipe is further optimized, and the appearance of the pipe is much better.

In the outer reinforcement layer, the bamboo strips are radially wound to form a second radial layer to adhere to the outer surface of the sand-adhesive thickening layer. The outer reinforcement layer can also be wound by the bamboo strips in the single radial direction according to different use requirement so as to reduce the production cost to the utmost on the basis of ensuring the use strength of the pipe.

The inner liner layer is formed by adhering a bamboo fiber nonwoven fabric to a needled bamboo mat by an adhesive, and a thickness of the inner liner layer is between 1.2 mm and 2.5 mm. The inner liner layer of the above material and thickness features anti-seepage, anticorrosion, sanitation, and smooth inner wall. In addition to the above nonwoven fabric and the needled mat, other types of nonwoven fabric and needled mat can be adopted according to different transmission media.

The outer protection layer is coated on an outer surface of the outer reinforcement layer, and a thickness of the outer protection layer is between 0.5 and 1.5 mm. The outer protection layer adopts anticorrosive and waterproof materials. When the pressure pipe is used in good external environment, the thickness of the outer protection layer can be much thinner, and a minimum thickness of 0.2 mm is able to satisfy the protection function.

The inner liner layer, the inner reinforcement layer, the sand-adhesive thickening layer, and the outer reinforcement layer are adhered and cured integratedly. Thus, the product reaches the designed strength and rigidity, which is convenient for package, storage, and transportation.

Compared with the prior art, the thermosetting bamboo-sand composite pressure pipe in accordance with embodiments of the invention have the following advantages: the thermosetting bamboo-sand composite pressure pipe comprises the sand-adhesive thickening layer, and the ore sand is utilized therein to improve the thickness of the pipe, the rigidity of the pipe is increased, and the material cost of the composite pressure pipe is reduced. It provides pipes of high quality and competitive price for application fields with low pressure and high rigidity as agricultural irrigation etc.

BRIEF DESCRIPTION OF THE DRAWINGS

FIG. 1 is a structure diagram of a thermosetting bamboo-sand composite pressure pipe.

DETAILED DESCRIPTION OF THE EMBODIMENTS

For further illustrating the invention, experiments detailing a thermosetting bamboo-sand composite pressure pipe are described hereinbelow combined with the drawings.

Example 1

A thermosetting bamboo-sand composite pressure pipe DN600 is mainly used in technical fields of main pipes in agricultural irrigation, drainage pipes in municipal engineering, sub-main pipes for sewage gathering pipelines, oil pipes and water pipes for oil exploration, and circulating cooling water. As shown in FIG. 1, the composite pressure pipe of the invention comprises: an inner liner layer 1, an inner reinforcement layer 2, a sand-adhesive thickening layer 3, an outer reinforcement layer 4, and an outer protection layer 5. The inner liner layer 1, the inner reinforcement layer 2, the sand-adhesive thickening layer 3, and the outer reinforcement layer 4 are respectively adhered and cured to composite integratedly. The outer protection layer 5 is coated on an outer surface of the outer reinforcement layer 4. Specific working process is as follows:

1. Fresh bamboo is processed into bamboo strips having a length of between 0.5 and 2 m, a width of between 5 and 10 mm, and a thickness of between 0.3 and 1 mm.

2. A release film is coated on a polished straight pipe module made of a steel or a glass steel having an outer diameter of 600 mm, and then the inner liner layer 1 having the thickness of between 1.2 and 2.5 mm is manufactured on the straight pipe module by using a resin having excellent anticorrosion performance, a bamboo fiber nonwoven fabric, and a needled bamboo mat.

3. After the inner liner layer 1 is cured, the bamboo strips are loaded on a winding machine and then regularly laid on the inner liner layer 1 on the straight pipe module by mechanical winding, during which an amino resin is added according to a certain formulation to form the inner reinforcement layer 2. The winding of the inner reinforcement layer 2 is conducted as follows: the bamboo strips are first radially wound to form a first radial layer to adhere to the outer surface of the inner liner layer; and the bamboo strips are then axially wound to form a first axial layer to adhere to an outer surface of the first radial layer. A thickness of the whole inner reinforcement layer 2 is 4 mm.

4. An evenly blended mixture of ore sand and adhesive is thereafter coated on the inner reinforcement layer 2 to form the sand-adhesive thickening layer 3 having a thickness of 10 mm.

5. The outer reinforcement layer 4 is manufactured outside the sand-adhesive thickening layer 3, the process of which is in accordance with that of the manufacture of the inner reinforcement layer 2 except that in the outer reinforcement layer 4, the bamboo strips are first axially wound to form a second axial layer to adhere to the outer surface of the sand-adhesive thickening layer; and the bamboo strips are then radially wound to form a second radial layer to adhere to an outer surface of the second axial layer. The thickness of the outer reinforcement layer 4 is 4 mm.

6. After the winding, the pipe is heated and cured to crosslink and cure the resin so as to form the integrated thermosetting bamboo-sand composite pressure pipe.

7. A layer of waterproof and anticorrosive resin with anti-radioactive filler is coated outside the pipe so as to form the outer protection layer 5 having a thickness of between 0.5 and 1 mm.

The pipe is performed with hydraulic testing, from which it is indicated that a short-time failure pressure reaches 1.2 megapascal, a rigidity reaches 10000 $N/m^2$, and a material density of the pipe is between 1.4 and 1.5.

Example 2

A thermosetting bamboo-sand composite pressure pipe DN300 is mainly used in technical fields of sub-main pipes in agricultural irrigation, drainage pipes in municipal engineering, upper branch pipes for sewage gathering pipelines, oil pipe and water pipe for oil exploration, and circulating cooling water. As shown in FIG. 1, the composite pressure pipe of the invention comprises: a inner liner layer 1, an inner reinforcement layer 2, a sand-adhesive thickening layer 3, an outer reinforcement layer 4, and an outer protection layer 5. The inner liner layer 1, the inner reinforcement layer 2, the sand-adhesive thickening layer 3, and the outer reinforcement layer 4 are respectively adhered and cured integratedly. The outer protection layer 5 is coated on an outer surface of the outer reinforcement layer 4. Specific working process is as follows:

1. Fresh bamboo is processed into bamboo strips having a length of between 0.5 and 2 m, a width of between 5 and 10 mm, and a thickness of between 0.3 and 1 mm.

2. A release film is coated on a polished straight pipe module made of a steel or a glass steel having an outer diameter of 300 mm, and then the inner liner layer 1 having the thickness of between 1.2 and 2.5 mm is manufactured on the straight pipe module by using a resin having excellent anticorrosion performance, a bamboo fiber nonwoven fabric, and a needled bamboo mat.

3. After the inner liner layer 1 is cured, the bamboo strips are loaded on a winding machine and then regularly laid on the inner liner layer 1 of the straight pipe module by mechanical winding, during which an amino resin is added according to a certain formulation to form the inner reinforcement layer 2. The winding of the inner reinforcement layer 2 is conducted as follows: the bamboo strips are first radially wound to form a first radial layer to adhere to the outer surface of the inner liner layer; and the bamboo strips are then axially wound to form a first axial layer to adhere to an outer surface of the first radial layer. A thickness of the whole inner reinforcement layer 2 is 4 mm.

4. An evenly blended mixture of ore sand and resin is thereafter coated on the inner reinforcement layer 2 to form the sand-adhesive thickening layer 3 having a thickness of 6 mm.

5. Bamboo strips are radially wound a layer on the outer surface of the sand-adhesive thickening layer 3 to form the outer reinforcement layer 4, and the thickness of the outer reinforcement layer 4 is 2 mm.

6. After the winding, the pipe is heated and cured to crosslink and cure the resin so as to form the integrated thermosetting bamboo-sand composite pressure pipe.

7. A layer of waterproof and anticorrosive resin with anti-radioactive filler is coated outside the pipe so as to form the outer protection layer 5 having a thickness of between 0.5 and 1 mm.

The pipe is performed with hydraulic testing, from which it is indicated that a short-time failure pressure reaches 1.6 megapascal, and a rigidity reaches 15000 N/m$^2$.

In addition to the above bamboo fiber nonwoven fabric and the needled bamboo mat, other types of nonwoven fabric and needled mat can be adopted according to different transmission media. When the pressure pipe is used in good external environment, the thickness of the outer protection layer can be much thinner, and a minimum thickness of 0.2 mm is able to satisfy the protection function.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A thermosetting bamboo-sand composite pressure pipe, the pressure pipe comprising:
    an inner liner layer and an outer protection layer arranged from inside out in a radial direction;
    an inner reinforcement layer formed by winding bamboo strips;
    a sand-adhesive thickening layer formed by an evenly blended mixture of ore sand and resin; and
    an outer reinforcement layer formed by winding bamboo strips,
    wherein the inner reinforcement layer, the sand-adhesive thickening layer, and the outer reinforcement layer are respectively disposed between the inner liner layer and the outer protection layer from the inside out in the radial direction,
    wherein in the inner reinforcement layer, the bamboo strips are first radially wound to form a first radial layer to adhere to an outer surface of the inner liner layer, and then the bamboo strips are axially wound to form a first axial layer to adhere to an outer surface of the first radial layer,
    in the outer reinforcement layer, the bamboo strips are first axially wound to form a second axial layer to adhere to an outer surface of the sand-adhesive thickening layer, and then the bamboo strips are radially wound to form a second radial layer to adhere to an outer surface of the second axial layer, and
    the inner liner layer, the inner reinforcement layer, the sand-adhesive thickening layer, and the outer reinforcement layer are adhered and cured in an integrated manner by heating.

2. The pressure pipe of claim 1, wherein the bamboo strips of the inner reinforcement layer and the outer reinforcement layer have a length between 0.5 m and 2 m, a width between 5 mm and 10 mm, and a thickness between 0.3 mm and 1 mm.

3. The pressure pipe of claim 1, wherein the inner liner layer is formed by adhering a bamboo fiber nonwoven fabric to a needled bamboo mat by an adhesive, and a thickness of the inner liner layer is between 1.2 mm and 2.5 mm.

4. The pressure pipe of claim 1, wherein the outer protection layer is coated on an outer surface of the outer reinforcement layer, and a thickness of the outer protection layer is between 0.5 mm and 1.5 mm.

5. A thermosetting bamboo-sand composite pressure pipe, the pressure pipe comprising:
    an inner liner layer;
    an inner reinforcement layer adjacent to the inner liner layer, the inner reinforcement layer including first bamboo strips wound radially in a first radial layer and adhered to an outer surface of the inner layer, and second bamboo strips wound axially in a first axial layer and adhered to an outer surface of the first radial layer;
    a sand-adhesive thickening layer adjacent to the first axial layer, the sand-adhesive thickening layer being formed by an evenly blended mixture of ore sand and resin;
    an outer reinforcement layer adjacent to the sand-adhesive thickening layer, the outer reinforcement layer including third bamboo strips wound axially in a second axial layer and adhered to an outer surface of the sand-adhesive thickening layer, and fourth bamboo strips wound radially in a second radial layer and adhered to an outer surface of the second axial layer; and
    an outer protection layer,
    wherein the inner liner layer, the inner reinforcement layer, the sand-adhesive thickening layer, and the outer reinforcement layer are adhered and cured in an integrated manner by heating, and
    the inner liner layer, the inner reinforcement layer, the sand-adhesive thickening layer, the outer reinforcement layer, and the outer protection layer are arranged from inside out in a radial direction.

6. The pressure pipe of claim 5, wherein the first and second bamboo strips of the inner reinforcement layer and the third and fourth bamboo strips of the outer reinforcement layer have a length between 0.5 m and 2 m, a width between 5 mm and 10 mm, and a thickness between 0.3 mm and 1 mm.

7. The pressure pipe of claim 5, wherein the inner liner layer is formed by adhering a bamboo fiber nonwoven fabric to a needled bamboo mat by an adhesive, and a thickness of the inner liner layer is between 1.2 mm and 2.5 mm.

8. The pressure pipe of claim 5, wherein the outer protection layer is coated on an outer surface of the outer reinforcement layer, and a thickness of the outer protection layer is between 0.5 mm and 1.5 mm.

* * * * *